US008841016B2

(12) United States Patent
Anderson et al.

(10) Patent No.: US 8,841,016 B2
(45) Date of Patent: Sep. 23, 2014

(54) BATTERY THERMAL SYSTEM WITH INTERLOCKING STRUCTURE COMPONENTS

(75) Inventors: Alastair Gordon Anderson, Wiesbaden (DE); Reiner Essinger, Lauteral (DE); Peter Gross, Hessen (DE); Axel Heise, Mainz (DE); Joachim Lauk, Bodenheim (DE); Ralf Lerch, Armsheim (DE); Manfred Mohr, Florsheim am Main (DE); Stefan Toepfer, Mainz-Kostheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 276 days.

(21) Appl. No.: 13/053,983

(22) Filed: Mar. 22, 2011

(65) Prior Publication Data
US 2012/0107649 A1 May 3, 2012

Related U.S. Application Data

(60) Provisional application No. 61/407,251, filed on Oct. 27, 2010.

(51) Int. Cl.
*H01M 10/50* (2006.01)
*H01M 10/6555* (2014.01)
*H01M 10/6551* (2014.01)
*H01M 10/647* (2014.01)
*H01M 10/613* (2014.01)

(52) U.S. Cl.
CPC ...... *H01M 10/5004* (2013.01); *H01M 10/5055* (2013.01); *H01M 10/5046* (2013.01); *H01M 10/5032* (2013.01); *Y02E 60/12* (2013.01)
USPC .......................................................... 429/120

(58) Field of Classification Search
USPC .................................................... 429/50, 120
See application file for complete search history.

(56) References Cited

U.S. PATENT DOCUMENTS

| | | | |
|---|---|---|---|
| 6,729,384 B1* | 5/2004 | Lo ................................. | 165/80.3 |
| 2007/0238018 A1* | 10/2007 | Lee et al. ...................... | 429/159 |
| 2008/0193830 A1* | 8/2008 | Buck et al. ..................... | 429/120 |
| 2011/0059347 A1* | 3/2011 | Lee et al. ...................... | 429/120 |
| 2011/0064985 A1* | 3/2011 | Lee et al. ...................... | 429/120 |
| 2012/0258337 A1 | 10/2012 | Wang | |

* cited by examiner

*Primary Examiner* — Muhammad Siddiquee
(74) *Attorney, Agent, or Firm* — Dinsmore & Shohl LLP

(57) ABSTRACT

A battery module is described. The battery module includes a plurality of battery cells; a plurality of cooling fin assemblies, each cooling fin assembly positioned between two battery cells, the cooling fin assemblies comprising at least one cooling fin and a foot on at least one side of the cooling fin assemblies, the foot having a bottom and interlocking profiles on each end, the interlocking profiles on adjacent feet of the cooling fin assemblies interlocking the feet and forming a surface; and a heat sink contacting the surface of the interlocked feet. A method of cooling a battery module is also described.

14 Claims, 6 Drawing Sheets

BATTERY THERMAL SYSTEM WITH INTERLOCKING STRUCTURE COMPONENTS

STATEMENT OF RELATED CASES

This application claims the benefit of U.S. Provisional Application Ser. No. 61/407,251, filed Oct. 27, 2010, entitled "Battery Thermal System with Interlocking Structure Components," which is incorporated herein by reference.

FIELD OF THE INVENTION

This invention relates generally to batteries, and more particularly to a battery thermal system with interlocking structural components.

BACKGROUND OF THE INVENTION

Current battery internal heat exchangers require numerous components and sealing connections, and complicated manufacturing processes. One known method for cooling battery cells is to bring two cells into face contact with a cooling fin through which coolant flows. The cooling fins are connected by integrating an inlet and outlet header hole on both sides of the fin. The inlet and outlet headers are then formed by stacking two or more fins together, and connecting the inlet and outlet header holes. An o-ring seal (or similar seal) may be used to form the seal between two fins. The seals for both inlet and outlet are typically integrated into a frame, which holds the cells and fins in place in the stack.

An example of this type of system is shown in FIG. 1. An expanded view of the battery pack 10 is shown. The battery cells 15 are separated by cooling fins 20. There is a cooling inlet 25 on one side of the cooling fin 20 and a cooling outlet 30 on the other side of the cooling fin 20. Coolant flows through channels 35 in the cooling fin 15. Heat from the battery cells 15 is conducted into the cooling fins 20. Two battery cells 15 and a cooling fin 20 can be contained in a frame 40. There are seals 45 on both sides of the cooling fin 15 for the cooling inlet 25 and cooling outlet 30. The seals 45 can be integrated into the frame 40. This arrangement requires multiple components and seals and a complicated assembly process.

SUMMARY OF THE INVENTION

One aspect of the invention is a battery module. In one embodiment, the battery module includes a plurality of battery cells; a plurality of cooling fin assemblies, each cooling fin assembly positioned between two battery cells, the cooling fin assemblies comprising at least one cooling fin and a foot on at least one side of the cooling fin assemblies, the foot having a bottom and interlocking profiles on each end, the interlocking profiles on adjacent feet of the cooling fin assemblies interlocking the feet and forming a surface; and a heat sink contacting the surface of the interlocked feet.

Another aspect of the invention is a method of cooling a battery module. The method includes providing a battery module comprising: a plurality of battery cells; a plurality of cooling fin assemblies positioned between two battery cells, the cooling fin assemblies comprising at least one cooling fin and a foot on at least one side of the cooling fin assemblies, the foot having a bottom and interlocking profiles on each end, the interlocking profiles on adjacent feet of the cooling fin assemblies interlocking the feet and forming a surface; and a heat sink contacting the surface of the interlocked feet; and circulating cooling fluid through the heat sink, the feet transferring the heat generated in the plurality of battery cells to the heat sink over a contact area between the heat sink and the surface.

DETAILED DESCRIPTION

The new design provides a simple, more robust battery internal heat exchanger which reduces cost, improves reliability, and simplifies manufacturing.

The design allows simplification of the battery internal heat exchanger. There are fewer seals with the present solid fin design because the coolant flow is only at the sides of the module, instead of between every battery cell or every other battery cell. By "solid fin," we mean that there are no cooling channels (and thus no coolant circulating) in the cooling fins between the cells.

In addition, the heat sink design is simple. There are also fewer components in the module because plastic frames are not required. Manufacturing is easier because the stacking procedure is simple. In addition, only normal cleanliness standards are required because no seals are made during stacking.

The thermal connection between a solid fin assembly and a heat sink is optimized because the interlocking foot design ensures that the fin feet align to each other and create a flat interface surface.

Thus, the design provides lower material, manufacturing, and warranty costs.

Figure 1:
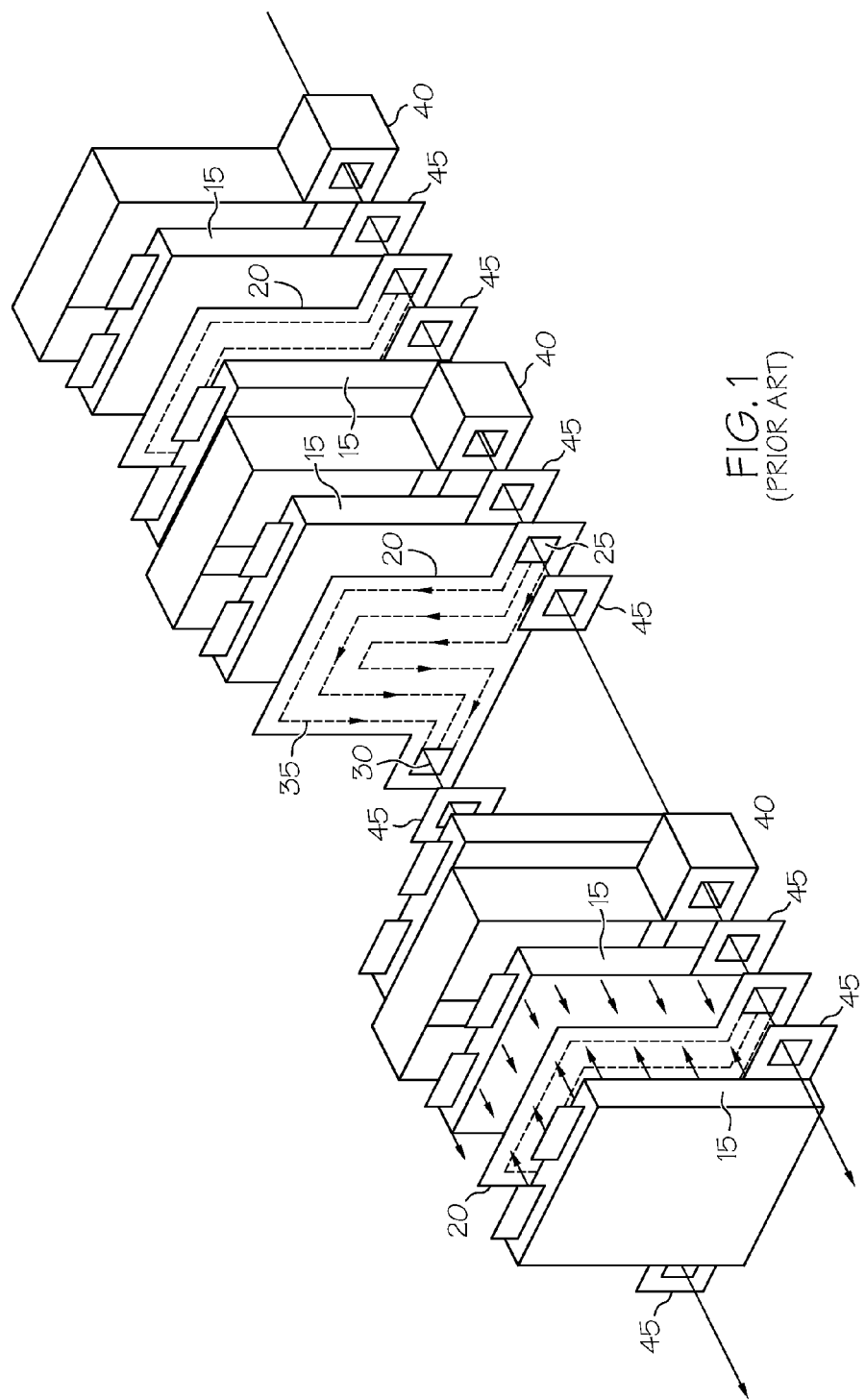
FIG. 1 is an illustration of a prior art method of cooling battery cells.
Figure 2:
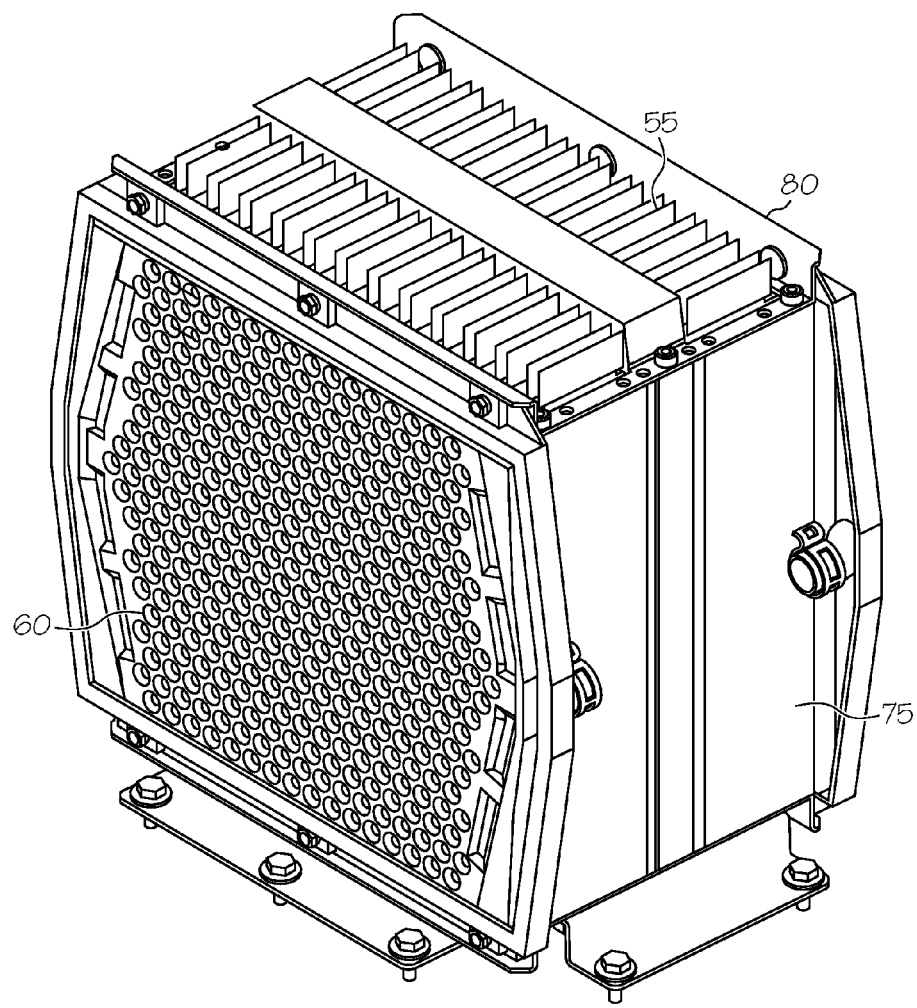
FIG. 2 is an illustration of one embodiment of a module heat exchanger.
Figure 3B:
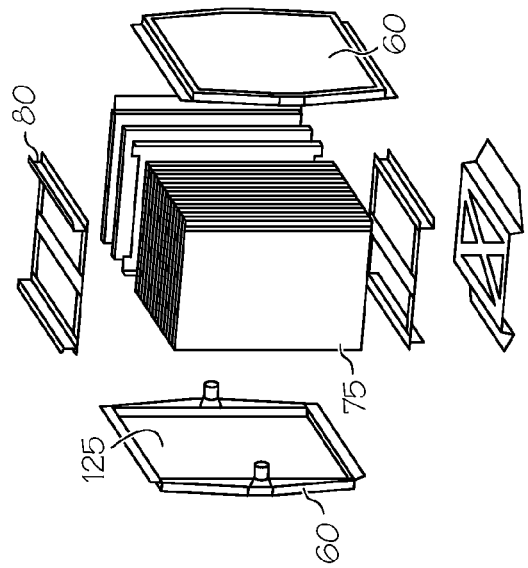
FIGS. 3A-B are illustrations of the module base of FIG. 2 in more detail.
Figure 3A:
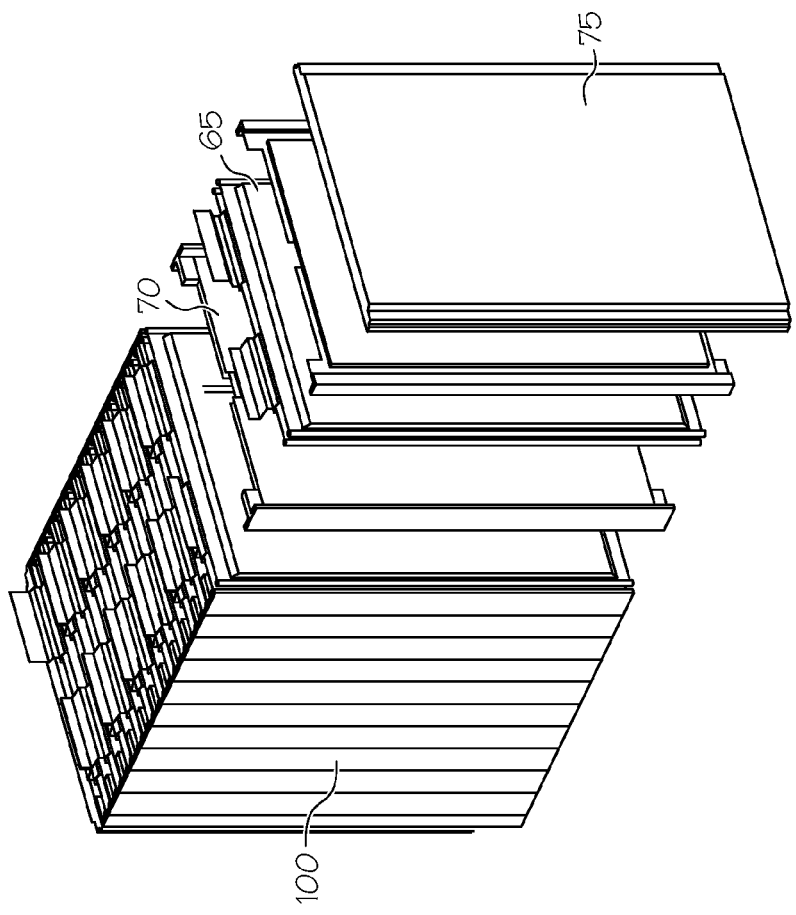

FIGS. 2, 3A, and 3B show one embodiment of the battery internal components for building the module 50. The module 50 has a module base 55 and a heat sink 60. The module base 55 contains the battery cells 65 and solid fin assemblies 70, which are stacked between the battery cells 65. The solid fin assemblies 70 conduct heat generated in the battery cells 65 to the heat sinks 60, which are mounted on at least one side of the module base 55 (typically both sides). The module base 55 can be held together by end plates 75 and brackets 80, if desired.

The solid fin assemblies 70 are stacked between the battery cells. In one embodiment, there can be solid fin assemblies between all of the battery cells (i.e., solid fin assembly, battery cell, solid fin assembly, battery cell, etc). However, other arrangements are possible, for example, arrangements in which there are solid fin assemblies between every two battery cells (i.e., solid fin assembly, 2 battery cells, solid fin assembly, 2 battery cells, etc.), or every three battery cells (i.e., solid fin assembly, 3 battery cells, solid fin assembly, 3 battery cells, etc.), etc.

The heat sinks 60 have a channel through which the coolant is pumped. The heat sinks can be formed by stamping two metal sheets (e.g., of aluminum) and brazing or welding them together, forming the channels. Because the heat sinks 60 are located on the sides of the module base 55, only one coolant inlet and outlet are needed for each heat sink. This eliminates the need for multiple seals for each cooling fin, and reduces the cost and complexity of the system.

Figure 4:
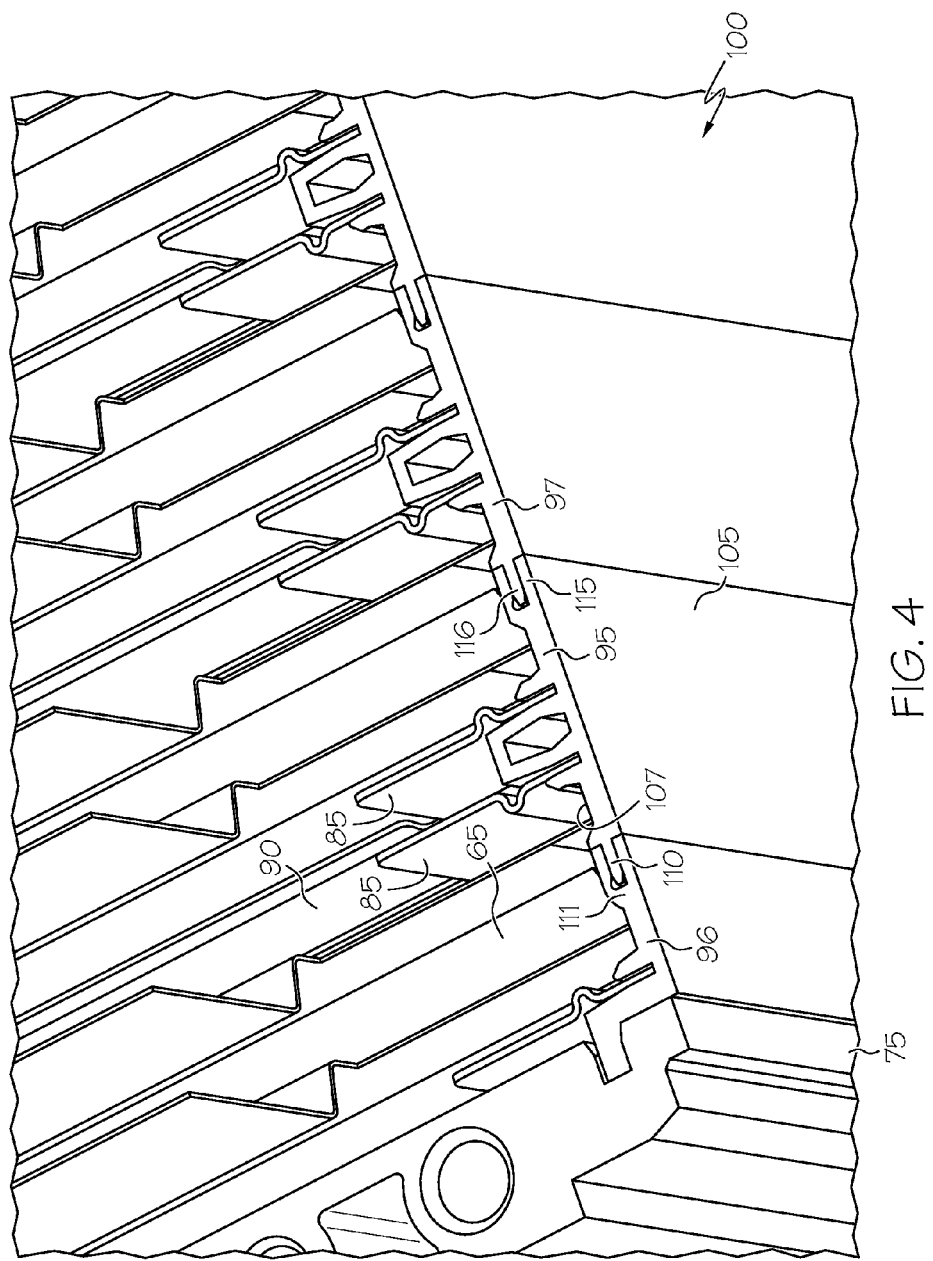
FIG. 4 is an illustration of a portion of the module base of FIG. 2 in more detail.
Figure 5:
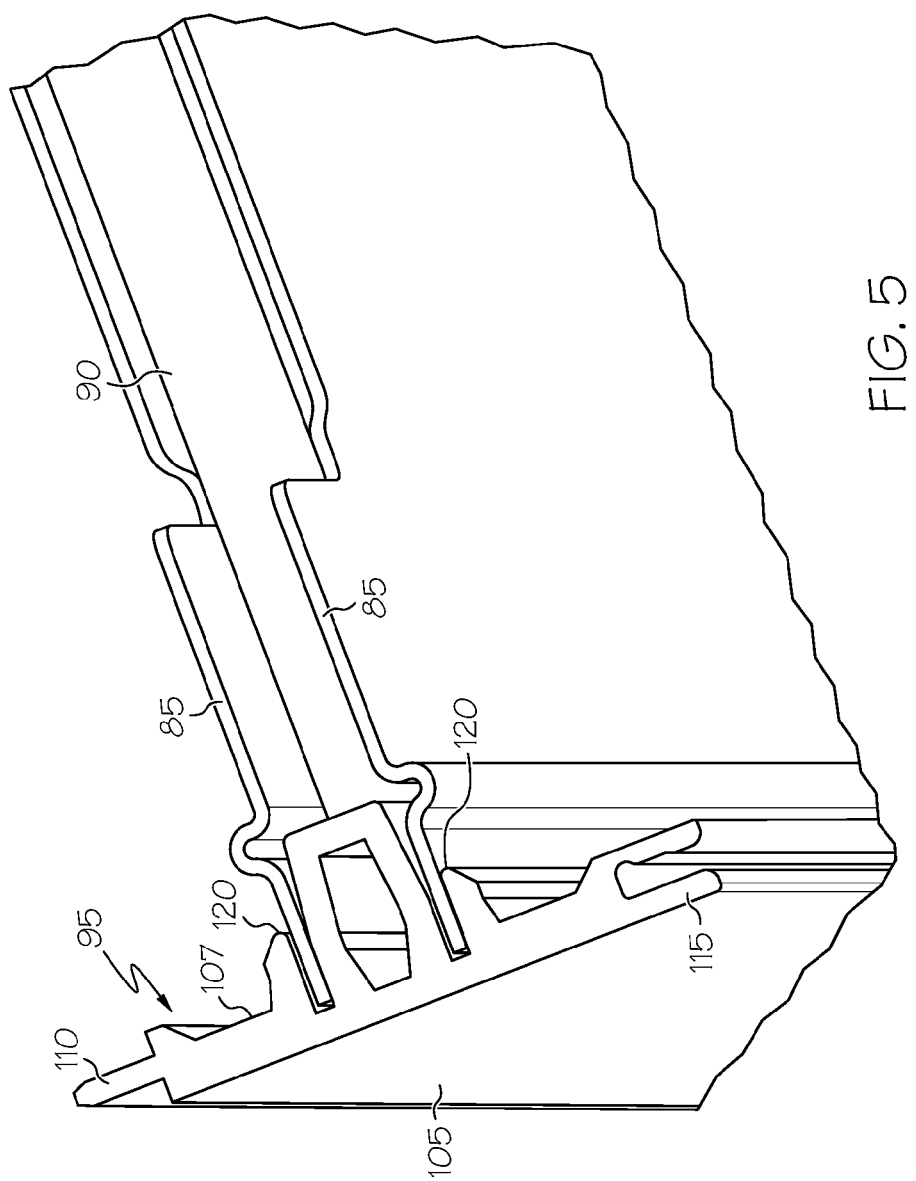
FIG. 5 is an illustration of one embodiment of the solid fin assembly.

FIGS. 4-5 show details of one embodiment of the solid fin assemblies 70. The solid fin assemblies 70 are placed between the battery cells 65. In one embodiment, a pair of solid fins 85 surround an expansion unit 90, and are inserted into a foot 95. The design of the solid fin assembly 70 allows deformation and therefore cell tolerance and expansion management.

The feet 95 are in contact with the heat sink 60. The contact can be direct such that the feet 95 touch the heat sink 60, or indirect in which there is a layer of material between the feet 95 and the heat sink 60, as discussed below.

The feet 95 have a top 107, a bottom 105 opposite the top 107, and interlocking profiles 110, 115 on opposite ends. The profile on one foot interlocks with the opposing profile on the next foot. As the battery cells 65 and solid fin assemblies 70 are stacked, the interlocking profiles 110, 115 on the feet 95 interlock with each other, forming a surface 100 onto which the heat sink 60 can be easily attached.

In one embodiment as shown, the bottom 105 of the feet is flat and consequently, the surface 100 is flat. However, other surface shapes are possible, such as a ribbed surface. The surface provides contact, and thus, heat transfer, with the heat sink. The surface shape should promote good contact and heat transfer.

One example of interlocking profiles 110, 115 is a tongue-and-groove arrangement as shown in FIG. 5, in which the feet 95 have a tongue profile 110 on one end and a groove profile 115 on an opposite end. As shown in FIG. 4, the tongue profile 110 projects from one end of the foot 95 and is received by and interlocks into a groove profile 111 of one adjacent foot 96. Likewise, the groove profile 115 on the opposite end of the foot 95 receives and interlocks with a tongue profile 116 projecting from another adjacent foot 97. However, other types interlocking profiles, such as lap joints, could be used, as is known to those of skill in the art.

The feet can be made of any material capable of transferring heat. Suitable materials include, but are not limited to, aluminum. Suitable processes for producing the feet include, but are not limited to, extrusion, which allows high volume manufacture.

The solid fins 85 can be placed in slots 120 on the top of the feet 95. The solid fins 85 can be separated by the expansion unit 90, which can be for example, a sheet of foam or a metal leaf spring. The expansion unit 90 compensates for the cell tolerance and expansion variation in the cell thickness direction. Alternatively, the solids fins could be spaced apart with nothing between them. In order for the cells to vary in thickness, the solid fins 85 move, and the free length of the solid fin 85 between the end of the cell and the start of the foot 95 allows the solid fin 85 to deform and accept different cell thicknesses.

In one embodiment, the feet are a separate piece from the solid fin assembly and are attached to the solid fin assemblies, as shown above. In another embodiment, the feet can be an integral part of the solid fins.

A layer 125 of thermal interface material (TIM) can optionally be applied between the inner surface of the heat sink 60 and the surface 100 formed by the feet 95, which helps to provide good thermal contact. The use of TIM material to make thermal contact between the foot and the heat sink allows easy disassembly of the battery module (as opposed to adhesive, for example, which would not permit easy disassembly). The heat generated in the cell is conducted along the solid fin, through the foot, across the TIM, and into the coolant flowing through the heat sink.

Figure 6C:
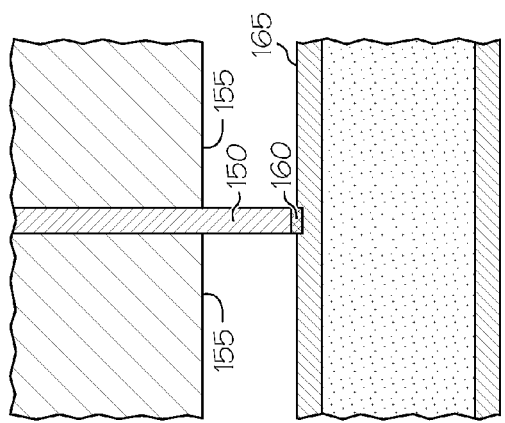
FIG. 6C is an illustration of the heat transfer for a cooling fin assembly with a foot.
Figure 6D:
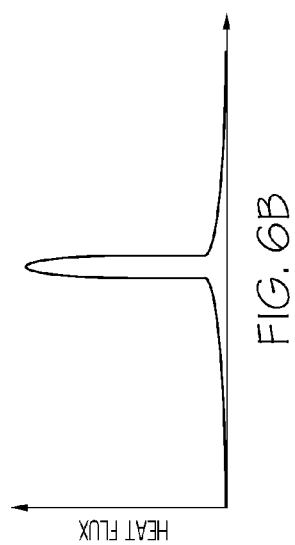
FIG. 6D is a graph illustrating the heat flux through the TIM for the system of FIG. 6C.
Figure 6A:
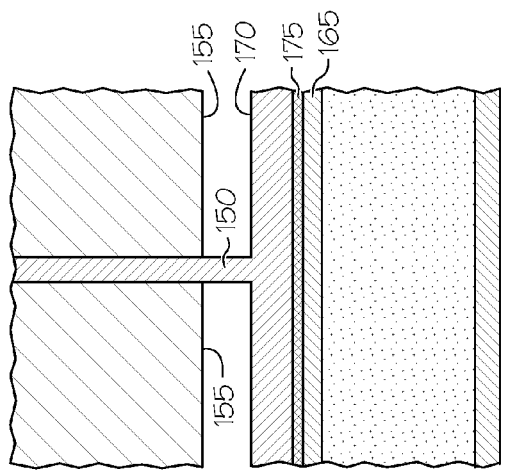
FIG. 6A is an illustration of the heat transfer for a system without a foot.
Figure 6B:
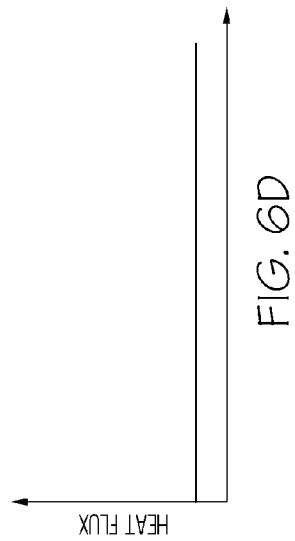
FIG. 6B is a graph illustrating the heat flux through the TIM for the system of FIG. 6A.

The shape and material of the feet are selected so that the heat flow from the battery cells to the heat sink is evenly distributed over the whole contact area between the feet and the heat sink (or feet, TIM, and heat sink) and without a large temperature drop in the feet themselves. As a result, there is no heat flow concentration, and the entire contact area between the feet and heat sink (or feet, TIM, and heat sink) is available for heat transfer. FIGS. 6A-B illustrate the effect of an assembly without feet. There is a cooling fin assembly 150 between two battery cells 155. The heat is forced through a very small area 160 of the TIM 165. As shown in FIGS. 6C-D, the cooling fin assembly includes interlocking feet 170. This transfers the heat evenly over a larger area 175 of TIM 165.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A battery module comprising:
   a plurality of battery cells;
   a plurality of cooling fin assemblies, each cooling fin assembly positioned between two battery cells, the cooling fin assemblies comprising:
   a foot having a top, a bottom opposite the top, and interlocking profiles along opposite ends of the foot, the top of the foot having a pair of slots defined therein;
   a pair of cooling fins inserted into the pair of slots in the top of the foot;

wherein the foot of the cooling fin assembly is a separate piece from the pair of cooling fins of the cooling fin assembly and is attached to the cooling fin assembly by the insertion of the pair of cooling fins into the pair of slots in the top of the foot;

wherein the plurality of cooling fin assemblies are stacked such that the interlocking profile on the foot of one cooling fin assembly interlocks with the interlocking profile on the foot of an adjacent cooling fin assembly to form interlocked feet, and such that the bottoms of the interlocked feet of the one cooling fin assembly and the adjacent cooling fin assembly together form an interface surface; and a heat sink in thermal contact with the interface surface of the interlocked feet.

2. The battery module of claim 1, further comprising a layer of thermal interface material between the interface surface of the interlocked feet and the heat sink.

3. The battery module of claim 1, wherein the cooling fin assemblies further comprise an expansion unit between the pair of cooling fins.

4. The battery module of claim 1, wherein the expansion unit is a layer of foam or a leaf spring.

5. The battery module of claim 1, wherein the interlocking profiles are tongue and groove profiles.

6. The battery module of claim 1, wherein the foot is made of aluminum.

7. The battery module of claim 1, wherein the interface surface of the interlocked feet is flat.

8. A battery module comprising:

a plurality of battery cells;

a plurality of cooling fin assemblies, each cooling fin assembly positioned between two battery cells, the cooling fin assemblies comprising a pair of cooling fins and a foot on at least one side of the cooling fin assemblies, the foot being a separate piece from the pair of cooling fins, the foot having a top, a flat bottom opposite the top, and tongue and groove profiles along opposite ends of the foot, the cooling fin assemblies being stacked such that the tongue and groove profiles on adjacent feet of the cooling fin assemblies interlock the feet, and such that the flat bottoms on the adjacent feet of the cooling fin assemblies together form a flat interface surface;

wherein the foot of each cooling fin assemblies has a pair of slots on the top of the foot, and the pair of cooling fins is positioned in the pair of slots; and a heat sink in thermal contact with the flat interface surface of the interlocked feet.

9. The battery module of claim 8, further comprising a layer of thermal interface material between the flat interface surface of the interlocked feet and the heat sink.

10. The battery module of claim 8, wherein the cooling fin assemblies further comprise an expansion unit between the pair of cooling fins.

11. The battery module of claim 10, wherein the expansion unit is a layer of foam or a leaf spring.

12. The battery module of claim 8, wherein the feet of the cooling fin assemblies are made of aluminum.

13. The battery module of claim 8, wherein the tongue and groove profiles along opposite ends of the foot of the cooling fin assemblies comprise a tongue profile on one end of the foot and a groove profile on an opposite end of the foot.

14. The battery module of claim 13, wherein:

the tongue profile of the foot projects from the one end of the foot and is received by a groove profile of one adjacent foot; and the groove profile of the foot receives a tongue profile that projects from another adjacent foot.

\* \* \* \* \*